Aug. 7, 1934.            M. A. SMITH, JR            1,969,280
                           PROPELLER
                    Filed June 30, 1932        2 Sheets-Sheet 1
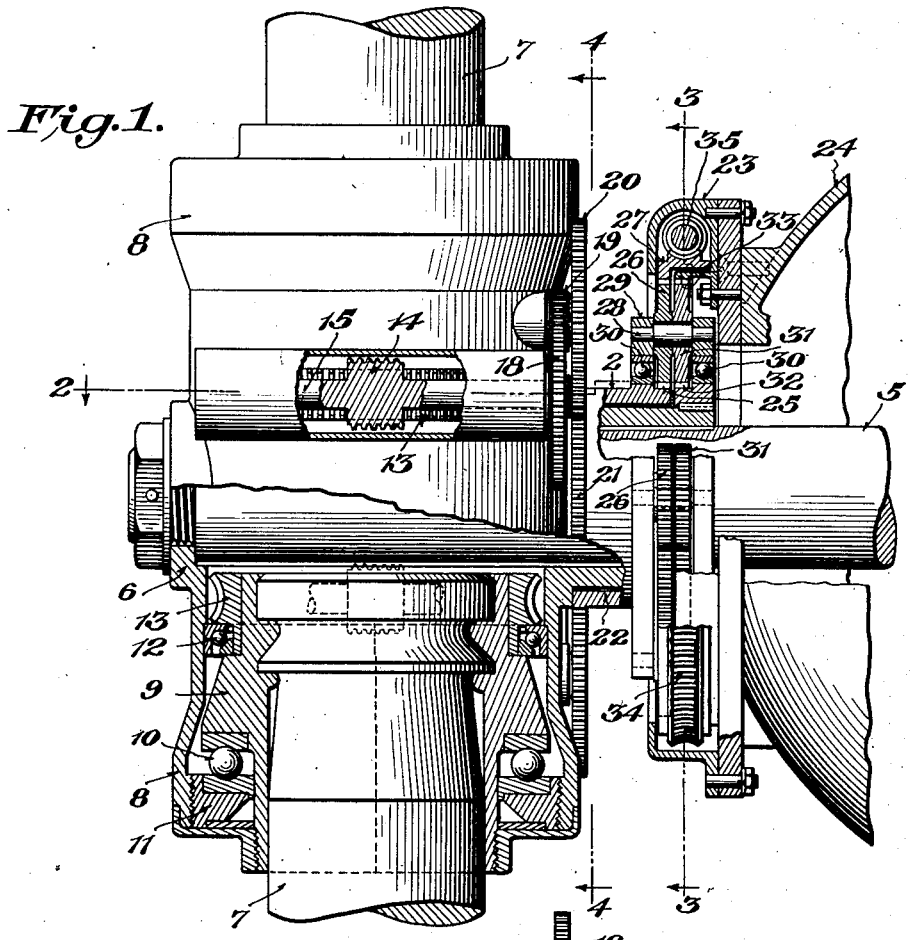
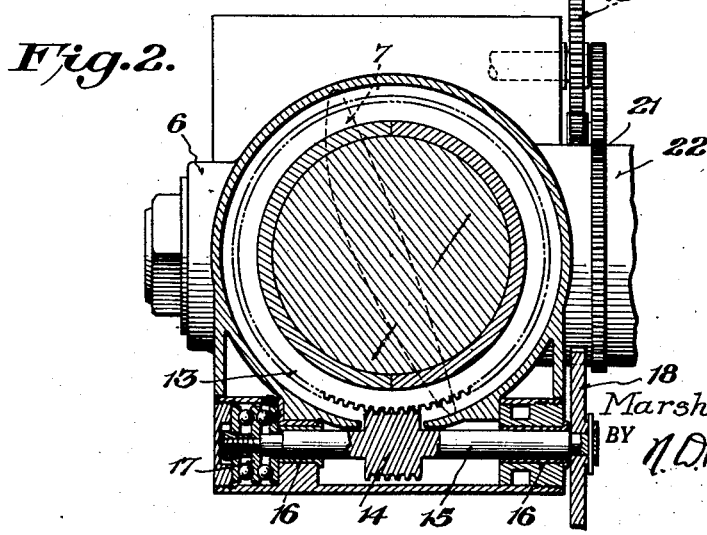
INVENTOR.
Marshall A. Smith, Jr.,
BY
ATTORNEY Aug. 7, 1934. M. A. SMITH. JR 1,969,280
PROPELLER
Filed June 30, 1932 2 Sheets-Sheet 2

INVENTOR.
Marshall A. Smith, Jr.,
BY
ATTORNEY

Patented Aug. 7, 1934

1,969,280

UNITED STATES PATENT OFFICE 1,969,280

PROPELLER

Marshall A. Smith, Jr., South Bend, Ind., assignor to Bendix Aviation Corporation, South Bend, Ind., a corporation of Delaware Application June 30, 1932, Serial No. 620,262

5 Claims. (Cl. 170—163)

This invention relates to propellers and more particularly to propellers in which the pitch of the blades can be changed during operation.

One of the objects of the present invention is to provide a novel propeller in which the pitch of the blades can be varied during operation.

Another object is to provide a novel propeller of the above character wherein the pitch of the blades is changed by a novel double epicyclic gear train arrangement.

Still another object is to provide a novel propeller construction of the above character, the entire pitch-changing assembly being embodied in a simple, compact structure which is reliable and efficient in operation and is small and light in weight so as to be readily adapted for use on aircraft.

Other objects and advantages will appear from the following detailed description taken in connection with the accompanying drawings which show one embodiment of the invention. It is to be expressly understood, however, that the drawings are for the purpose of illustration only and are not to be taken as a definition of the limits of the invention, reference being had for this purpose to the appended claims.

In the drawings, wherein like reference numerals indicate like parts throughout the several views:

Fig. 1 is a side view partly in section and partly in elevation of a propeller embodying the present invention;

Fig. 2 is a section on line 2—2 of Fig. 1;

Figure 3:
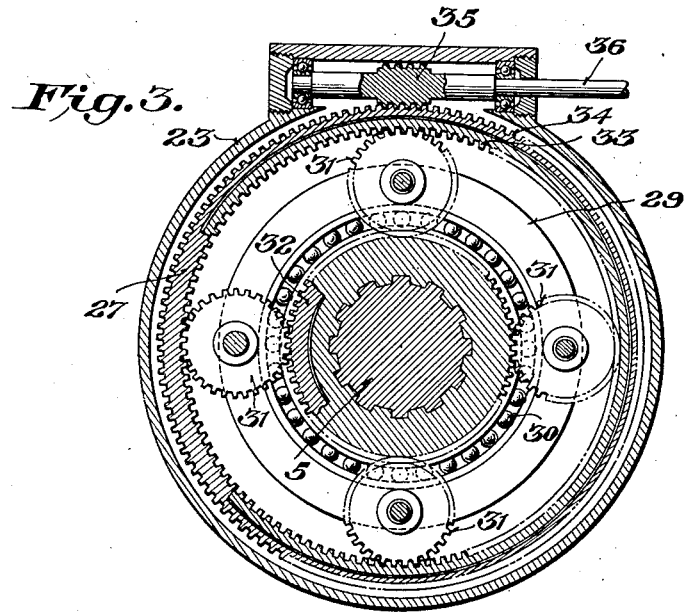
Fig. 3 is a section on line 3—3 of Fig. 1 with parts broken away.
Figure 4:
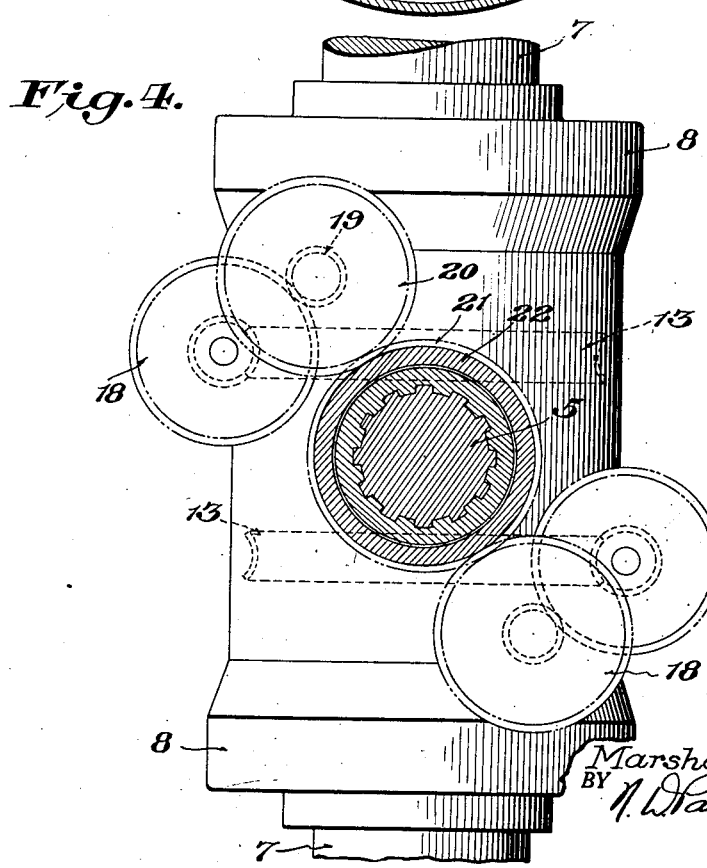
Fig. 4 is a diagrammatic view taken on line 4—4 of Fig. 1.

Referring more particularly to the drawings, the propeller shown therein as embodying the present invention is constituted by a driving or power shaft 5 suitably connected to a source of power such as, for example, an internal combustion engine, and a hub 6 rigidly secured to the shaft 5 in any suitable manner, a plurality of blades 7 being rotatably secured in sockets 8 in the hub by means of sleeve members 9 which are rigidly secured to the blade roots and provide races for bearings 10 which are retained in the hub by annular nuts 11. Preferably, a series of bearing 12 are also provided between the sleeve members 9 and sockets 8 to maintain the blades in alignment in the sockets while permitting free rotation therebetween.

A worm wheel 13 is provided on the inner end of each of the sleeves 9 adapted to mesh with a worm 14 rigidly secured to a shaft 15 mounted in suitable bearings 16 in the hub, whereby the sleeves 9 and the blades secured therein will be rotated in sockets 8 to change the pitch of the blades when the shafts 15 are rotated. A suitable thrust bearing 17 is preferably provided in connection with each shaft 15 to absorb the thrust which is imparted to the shaft during operation. Preferably, the pitch of the worms 14 is such that the same are self-locking so that the blades will be prevented from rotating in their sockets in response to any blade torsional forces created during operation of the propeller.

Means are provided for effecting pitch-changing rotation of the blades, and preferably, such means are of the double-epicyclic gear type. As shown, such means are constituted by a gear wheel 18 secured to each of the shafts 15 and meshing with a small pinion 19 which is secured to a gear wheel 20, the latter meshing with gear teeth 21 cut on a sleeve 22 which is rotatably mounted on the driving shaft. The sleeve 22 extends along the driving shaft through an opening in a suitable gear case 23 rigidly secured to a stationary part, such, for example, as a part of the engine crank case 24, and has gear teeth 25 cut in its opposite end. A planet gear 26 meshes with the gear teeth 25 and with an internal ring gear 27 rotatably mounted in the case 23, the gear 26 being rotatably carried by an axle 28 supported by a suitable carriage 29 surrounding the driving shaft and rotatably mounted with respect thereto as by means of bearings 30. A second planet gear 31 having the same number of teeth as gear 26, is rotatably mounted independently of planet gear 26 on the axle 28 and meshes with a sun gear 32 having the same number of teeth as gear 25, the said gear 32 being keyed or otherwise suitably secured to the driving shaft. Gear 31 meshes also with an internal ring gear 33 having the same number of teeth as the gear 27 and being rigidly secured to a stationary part. The gear 27 extends over the gear 33 and has formed on its outer periphery a worm gear 34 which meshes with a worm 35 rotatably mounted in the gear case 23. The worm 35, as shown, is rigidly secured to a shaft 36, Fig. 3, which extends through the casing 23 and has secured thereto in any suitable manner an operating member, not shown, but which may take the form of either a manually operable crank or handwheel or any suitable power means, the control for which may be located in any convenient place as, for example, on the instrument panel of the craft with which the propeller is used. While only one set of planetary gears has been described, it will be apparent that any desired number of sets may be provided, for example, four, as clearly indicated in Fig. 3.

In operation, when the driving shaft 5 is rotated, it causes rotation of planet gear 31 which rolls around on the relatively stationary gear 33 thus causing rotation of the carriage 29 and gear 26 around the driving shaft. The gear 26 rolls on the gear 27 which is normally held stationary by the worm 35 and rotates about axle 28, the rates of rotation of gears 26 and 31 about axle 28 being equal, since the corresponding meshing gears have the same number of teeth. Rotation of gear 26 causes rotation of gear 25 and sleeve 22, and since gear 25 has the same number of teeth as gear 32, sleeve 22 will rotate in the same direction and at the same rate as the driving shaft. Accordingly, there will be no relative movement between gears 20 and 21 and the pitch of the blades will remain unchanged. To change the pitch of the blades, the operator turns the worm 35 through worm shaft 36 thus turning internal gear 27 relatively to the internal gear 33 and planet gear 26 relatively to planet gear 31. This results in rotation of sleeve 22 relatively to the driving shaft and hub and causes gear 21 through gears 20, 19 and 18 to turn the worm 14, thus rotating the blades in their sockets and changing the pitch thereof. It will be apparent that the change of pitch of the blades is proportional to the degree of rotation of worm 35 and shaft 36, and accordingly a suitable indicator, not shown, is preferably associated with the shaft 36 for indicating the pitch of the blades. It is, moreover, apparent that immediately upon cessation of the rotation of the shaft 36, the pitch of the blades will remain fixed, since the gear 25 and sleeve 22 will rotate in the same direction and at the same speed as the propeller shaft.

Thus, there is provided by the present invention a novel propeller in which the pitch of the blades can be changed during operation through a simple and efficient epicyclic gear train and utilizing the power of the propeller shaft, the whole being embodied in a small, compact structure which is light in weight and readily adapted for use on aircraft.

While only one embodiment of the present invention has been shown and described, it will be understood that the same is capable of being embodied in various mechanical forms. For example, mechanism other than the worm 14 and gear 13 might be employed for rotating the blades in their sockets or other changes occurring to one skilled in the art might be made without departing from the spirit and scope of the invention. Reference will accordingly be had to the appended claims for a definition of the limits of the invention.

What is claimed is:

1. A propeller comprising a driving shaft, a hub carried by said shaft, a plurality of blades rotatably carried by said hub, and means for rotating said blades to change the pitch thereof during operation of the propeller including a double epicyclic gear train having a pair of internal gears, one of the internal gears for said train being fixedly secured to a stationary part and the other internal gear being rotatably mounted, both of said gears encircling said shaft, and means including a control worm for rotating said second internal gear.

2. A propeller comprising a driving shaft, a hub carried by said shaft, a plurality of blades rotatably carried by said hub, and means for rotating said blades to change the pitch thereof including a sleeve rotatably mounted on said shaft, a sun gear carried by said sleeve, a second sun gear carried by said shaft, an internal gear fixedly secured to a stationary part, a second internal gear rotatably mounted with respect to said first-named internal gear, a planet gear engaging said stationary internal gear and the sun gear carried by the driving shaft, and a second planet gear engaging the rotatable internal gear and the sun gear on said sleeve, the two planet gears being mounted on a common axle.

3. A propeller comprising a driving shaft, a hub carried by said shaft, a plurality of blades rotatably carried by said hub, and means to rotate said blades to change the pitch thereof including a sleeve rotatably mounted on said driving shaft, a gear carried by said sleeve, a planet gear engaging said last-named gear, a ring gear engaging said planet gear, means including a control worm for rotating said ring gear, and a planetary gear train associated with the driving shaft and the said planet gear for revolving the planet gear bodily about the driving shaft, said gear train including an external gear fixedly secured to a stationary part.

4. A variable pitch propeller comprising a driving shaft, a hub on said shaft, a plurality of blades rotatably carried by said hub and means for rotating the blades about their axes to change the pitch thereof including a member associated with the driving shaft and adapted normally to rotate therewith, a double epicyclic gear system positively driven by said shaft and connected with said member for normally rotating the same at the same speed and in the same direction as the shaft, control means connected to one of the gears of said double epicyclic system to rotate said member relatively to the shaft, and connections between said member and blades whereby the pitch of the blades will be changed when the member is rotated relatively to the shaft.

5. A variable pitch propeller comprising a driving shaft, a hub on said shaft, a plurality of blades rotatably carried by the hub, and means for rotating said blades to change the pitch thereof including a member associated with said driving shaft and rotatable relatively thereto, a system of gearing for rotating said member, one of the gears of said system being secured to the shaft, another being secured to a fixed part and another being movably mounted on said fixed part, whereby said member is normally rotated at the same speed and in the same direction as said driving shaft, control means for moving said movably mounted gear to rotate said member relatively to the shaft, and connections between said member and blades whereby the pitch of the blades will be changed when the member is rotated relatively to the shaft.

MARSHALL A. SMITH, Jr.